United States Patent
Pingenot et al.

(10) Patent No.: US 10,049,159 B2
(45) Date of Patent: Aug. 14, 2018

(54) TECHNIQUES FOR DATA RETRIEVAL IN A DISTRIBUTED COMPUTING ENVIRONMENT

(71) Applicant: SAS Institute Inc., Cary, NC (US)

(72) Inventors: Joseph Albert F. S. Pingenot, Fuquay Varina, NC (US); Christopher Daniel Bailey, Cary, NC (US)

(73) Assignee: SAS Institute Inc., Cary, NC (US)

( * ) Notice: Subject to any disclaimer, the term of this patent is extended or adjusted under 35 U.S.C. 154(b) by 512 days.

(21) Appl. No.: 14/218,057

(22) Filed: Mar. 18, 2014

(65) Prior Publication Data

US 2014/0280247 A1 Sep. 18, 2014

Related U.S. Application Data

(60) Provisional application No. 61/792,121, filed on Mar. 15, 2013.

(51) Int. Cl.
*G06F 17/30* (2006.01)

(52) U.S. Cl.
CPC .. *G06F 17/30864* (2013.01); *G06F 17/30545* (2013.01); *G06F 17/30584* (2013.01)

(58) Field of Classification Search
CPC ......... G06F 17/30864; G06F 17/30545; G06F 17/30584
See application file for complete search history.

(56) References Cited

U.S. PATENT DOCUMENTS

| | | | | |
|---|---|---|---|---|
| 5,630,059 A * | 5/1997 | Brady | ................... | G06F 13/128 709/217 |
| 6,204,846 B1 * | 3/2001 | Little | .................. | G06F 3/04855 715/784 |
| 6,393,415 B1 * | 5/2002 | Getchius | ............ | G06F 17/3048 |
| 8,990,199 B1 * | 3/2015 | Ramesh | ............ | G06F 17/30256 707/736 |
| 9,152,671 B2 * | 10/2015 | Lin | .................... | G06F 17/30545 |
| 2001/0042204 A1 * | 11/2001 | Blaker | .............. | G06F 17/30949 713/165 |
| 2002/0083033 A1 * | 6/2002 | Abdo | .................. | G06F 17/3061 |
| 2004/0267772 A1 * | 12/2004 | Perloff | ....................... | G06F 7/24 |
| 2005/0187977 A1 * | 8/2005 | Frost | ................. | G06F 17/30584 |
| 2006/0224603 A1 * | 10/2006 | Correll, Jr. | ........ | G06F 17/30592 |
| 2011/0041136 A1 * | 2/2011 | Messier | ................ | G06F 9/5066 718/105 |
| 2011/0271282 A1 * | 11/2011 | Sutter, IV | ............. | G06F 9/5027 718/101 |
| 2012/0130984 A1 * | 5/2012 | Risvik | ............... | G06F 17/30619 707/715 |

(Continued)

*Primary Examiner* — James Trujillo
*Assistant Examiner* — Hubert Cheung

(57) ABSTRACT

Enhanced techniques for data retrieval in a distributed computing environment are described. A computing node of a distributed computing environment may receive a data request. The computing node may include one or more subsets of data. The computing node may be configured to search among the one or more subset of data for a beginning of a data range that is responsive to the data request. The computing node may be further configured to forward a data range responsive to the search to another computing node of the distributed computing system to be merged with one or more additional data ranges. Other embodiments are described and claimed.

45 Claims, 14 Drawing Sheets

(56) References Cited

U.S. PATENT DOCUMENTS

| | | | |
|---|---|---|---|
| 2012/0203745 A1* | 8/2012 | Myers | G06F 17/3033 707/691 |
| 2012/0254251 A1* | 10/2012 | Barbosa | G06F 17/30938 707/797 |
| 2013/0069948 A1* | 3/2013 | Dembo | G06T 11/206 345/440 |
| 2014/0172866 A1* | 6/2014 | Lin | G06F 17/30545 707/741 |

* cited by examiner

TECHNIQUES FOR DATA RETRIEVAL IN A DISTRIBUTED COMPUTING ENVIRONMENT

RELATED APPLICATION

This application claims the benefit of priority under 35 U.S.C. § 119(e) to U.S. Provisional Application No. 61/792,121, filed Mar. 15, 2013, which is hereby incorporated by reference in its entirety.

BACKGROUND

The amount of data stored by businesses, government agencies, academic institutions, and the like, continues to increase significantly. Large amounts of data may exceed the storage space available on a single computing device. Thus, data may be stored among many computing nodes in a distributed computing system. Requests for data from a distributed computing system may require a search among many different computing nodes to assemble a range of data that is responsive to a data request.

Often, a request for a range of data will require that the data range is searched and returned in an ordered fashion. For example, a salesperson may seek the top five customers from a set of data containing millions of customers. In another example, a census analyst may wish to search for commonalities among U.S. residents in the $25^{th}$ percentile of income. The time and resources required to respond to such data requests may increase when data needs to be returned in an ordered fashion since the data may not be stored in the same order within the computing nodes of a distributed computing environment.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Enhanced techniques for data retrieval in a distributed computing environment are described. In one embodiment, for example, a computing node of a distributed computing environment may receive a data request. The computing node may include one or more subsets of data. The computing node may be configured to search among the one or more subset of data for a beginning of a data range that is responsive to the data request. The computing node may be further configured to forward a data range responsive to the search to another computing node of the distributed computing system to be merged with one or more additional data ranges.

In various embodiments, a data request maybe received at a distributed computing system including a plurality of computing nodes. Each computing node of the distributed computing system may include a subset of data. A search may be performed among the plurality of computing nodes for a beginning of a data range that is responsive to the data request. Subsets of data may be forwarded between computing nodes within the distributed computing system, with the forwarding beginning with the identified computing node. The forwarded subsets of data may be merged into a final data range responsive to the data request. The final data range may be sent to a requesting device. Other embodiments are described and claimed.

These and other features will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are generally directed to techniques for data retrieval in a distributed computing environment. In particular, various embodiments may implement one or more sorting and merging techniques to efficiently sort and assemble a requested data range from subsets of data stored across multiple computing nodes of a distributed computing environment.

The techniques for data retrieval described herein may allow a plurality of computing nodes in a distributed computing environment to provide fast data retrieval, and without the need for highly optimized operating systems, file systems, and network connections. For example, the techniques for data retrieval described herein may retain some or all of the benefits gained by distributed processing of larger data sets, while decreasing retrieval times for specific data items within the distributed data subsets. Using existing hardware, software, and network connections, small or large requests for data from a distributed system may be processed in very short periods of time. In this manner, requests for data from large distributed computing environments may take the same amount of time as data requests from small single-machine systems. In an example, the shorter processing times provide for increases in system efficiency. Further, shorter processing times allow more requests to be served.

Figure 1:
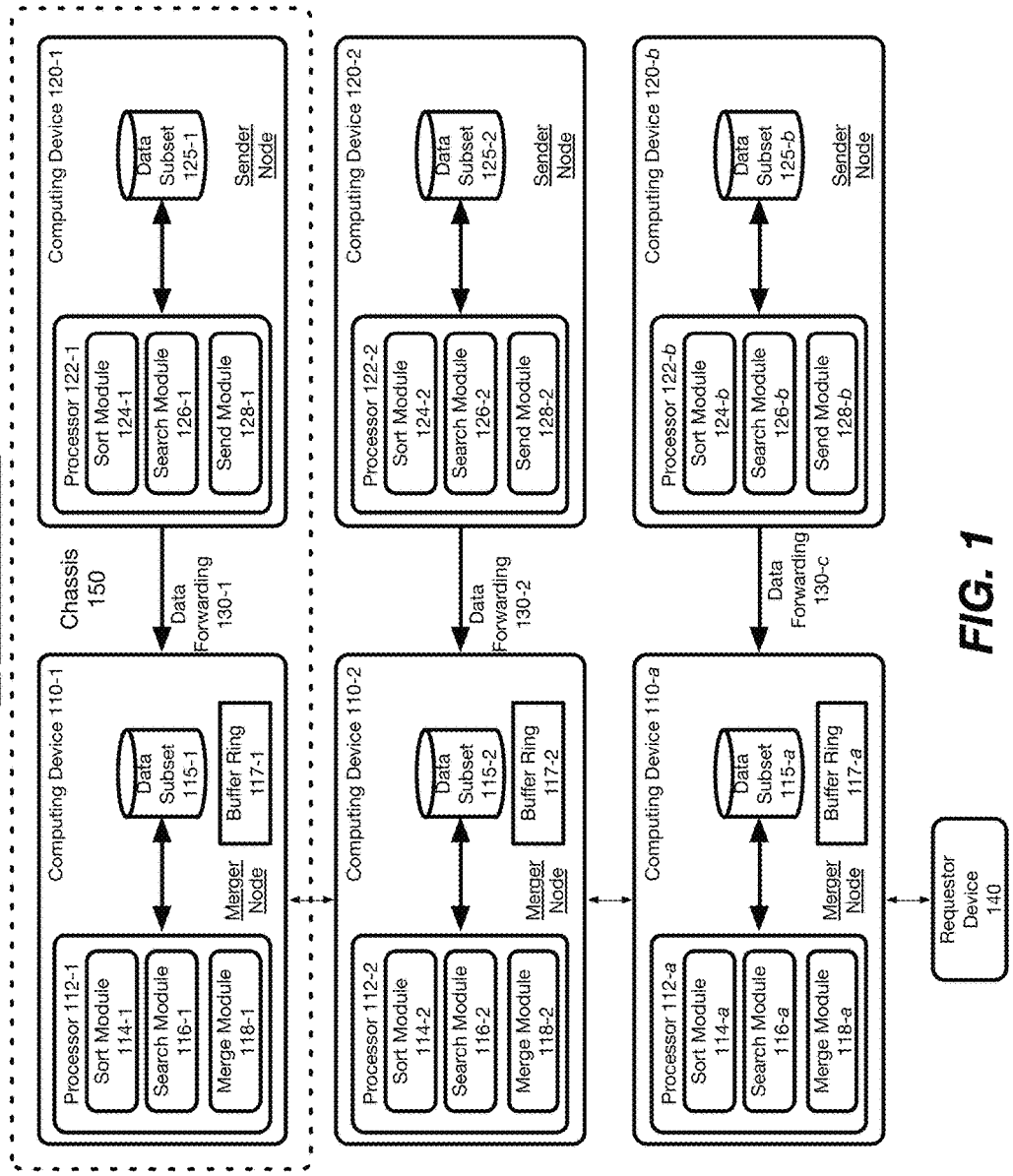
FIG. 1 illustrates an embodiment with an example of a system for data retrieval within a distributed computing environment.

FIG. 1 illustrates a block diagram for an example of a system 100 designed to implement various enhanced techniques for data retrieval within a distributed computing environment. The system 100 may be implemented as part of a computing system or communications system, examples of which are described in more detail with reference to FIGS. 13 and 14. Although the system 100 as shown in FIG. 1 has a limited number of elements in a certain topology, it may be appreciated that the system 100 may include more or less elements in alternate topologies as desired for a given implementation.

In the illustrated embodiment shown in FIG. 1, the system 100 includes multiple electronic devices, including computing devices 110-a, computing devices 120-b, and requestor device 140. It is worthy to note that "a" and "b" and "c" and similar designators as used herein are intended to be variables representing any positive integer. Thus, for example, if an implementation sets a value for a=5, then a complete set of computing devices 110 may include computing devices 150-1, 150-2, 150-3, 150-4 and 150-5. The embodiments are not limited in this context.

Computing devices 110, computing devices 120, and requestor device 140 may each be implemented as any electronic device having computing and/or communications capabilities. Examples of computing devices 110, computing devices 120, and requestor device 140 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a mainframe computer, a supercomputer, a network appliance, a web appliance, multiprocessor systems, processor-based systems, or any combination thereof. The embodiments are not limited in this context.

In various embodiments, computing devices 110, computing devices 120, and requestor device 140 may include or implement multiple components or modules. As used herein the terms "component" and "module" are intended to refer to computer-related entities, comprising either hardware, a combination of hardware and software, software, or software in execution. For example, a component and/or module can be implemented as a process running on a processor (such as processors 112-a or processors 122-b), a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices of system 100, and components and/or modules within a device of system 100, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of transmissions communicated over the communications media. The information can be implemented as transmissions allocated to various communication lines. In such allocations, each message is a transmission. Further embodiments, however, may alternatively employ data messages. Such data messages may be sent across various connections. Exemplary connections within a device include parallel interfaces, serial interfaces, and bus interfaces. Exemplary connections between devices may include network connections over a wired or wireless communications network.

In various embodiments, computing devices 110, computing devices 120, and requestor device 140 of the system 100 may be organized as a distributed system. A distributed system typically includes multiple computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

In various embodiments, the one or more of computing devices 110, computing devices 120, and requestor device 140 may operate as a central processing node or coordinating device to coordinate distributed processing operations implemented by computing devices 110, computing devices 120, and requestor device 140. As shown, computing devices 110 and computing devices 120 may include one or more processors 112 and 122 and one or more data subsets 115-a and 125-b communicatively coupled to the processors 112 and 122. Data subsets 115 and 125 may include memory units, which may store various data blocks for retrieval and software programs, such as sort modules 114-a and 124-b, search modules 116-a and 126-b, merge modules 118-a, and send modules 128-b, for example. In one embodiment, each of these components and/or modules may be software elements that when executed by processors 112 and 122 performs a discrete set of operations.

Sort modules 114 and 124 are generally arranged to manage sorting operations needed to sort data stored within data subsets 115 and 125. Each of data subsets 115 and 125 may include a portion of data from a larger set of data stored within system 100. A total data set may typically include, for example, a distribution of multiple data items, data elements, or samples within a given population (collectively referred to herein as "data items"). In one embodiment, the data items may each include an alphanumeric value. The data subsets 115 and 125 may each include a discrete grouping or collection of one or more data items from the total data set. By way of example, a total data set may have 1,000,000 data items evenly divided into 10 data subsets data subsets 115-5 and 125-5 each comprising 100,000 data items.

A particular size implemented for a total data set or data subsets 115 and 125 may vary according to a particular application or task. However, a typical size for a total data set may run into terabytes or larger, thereby needing distributed processing in the form of one or more data subsets 115 and 125 to process the total data set within acceptable time frames. Acceptable time frames may vary according to a given application, but for commercial applications acceptable time frames are typically measured in centiseconds, milliseconds, or shorter time intervals. As such, each of data subsets 115 and 125 may be allocated to each of the computing devices 110 and computing devices 120 shown in FIG. 1. Although FIG. 1 shows only six computing devices 110 and 120, for purposes of clarity, it may be appreciated that any number of computing devices 110 and 120 may be used as desired for a given implementation. The embodiments are not limited in this context.

As described above, data subsets 115 and 125 may be allocated among multiple computing, or processing, nodes of system 100, such as computing devices 110 and computing devices 120. Each processing node may be assigned one or more data subsets to process. A processing node may represent some discrete measure of computational resources. Examples of a processing node may include without limitation a processing thread, multiple processing threads, a processor, multiple processors, and so forth. One or more processing nodes may be implemented on a single device or multiple devices. For instance, when implemented by a single device such as computing device 110-1, a processing node may include a processing thread implemented on a single processor. In this case multiple processing nodes may be implemented as multiple processing threads on one of the processors 112 or processors 122, a single processing thread on each of multiple of processors 112 and processors 122, multiple processing threads on multiple processors 112 and processors 122, or some combination thereof. In another example, when implemented by multiple devices such as computing devices 110 and computing devices 120, a processing node may include an entire computing device having one or more processors. In this case, multiple processing nodes may be implemented as two or more computing devices, such as computing devices 110 and computing devices 120. It may be appreciated that multiple processing nodes may be implemented in any combination of single computing devices and multiple computing devices, each having one or more processors capable of executing one or more processing threads, as desired for a given implementation. The embodiments are not limited in this context.

In various embodiments, multiple processing nodes as implemented by computing devices 110 and computing devices 120 may be arranged to process multiple data subsets 115 and 125 of a total data set in a parallel or sequential manner. In one embodiment, computing devices 110 and computing devices 120 may each perform a discrete set of operations for respective data subsets 115 and 125. In one embodiment, for example, each of computing devices 110 and computing devices 120 may be arranged to execute respective sort modules 114 and 124. The sort modules 114 and 124 may perform sorting operations to sort data elements from data subsets 115 and 125 into a defined order (e.g., ascending or descending numeric values, alphabetical order, etc.). In some embodiments, data elements themselves may be sorted. In other embodiments, pointers or references to data items may be sorted. In this manner, data items may not be moved, but instead, one or more data structures including pointers or references may be sorted, which may provide efficiency and performance advantages. Data subsets 115 and 125 may be sorted into a defined order, and once sorted, may be referred to herein as "sorted data subsets."

More particularly, sort modules 114 and 124 may sort one or more data subsets 115 and 125 into some defined sorting order in one or more data sorting sessions. Sort orders may vary, where examples of which include a descending order (e.g., smallest values to largest values), an ascending order (e.g., largest values to smallest values), and so forth. Similarly, the sort modules 114 and 124 of the respective computing devices 110 and computing devices 120 may each sort one or more data subsets 115 and 125 in one or more data sorting sessions. In a typical implementation, each of the sort modules 114 and 124 may each sort different data subsets 115 and 125 to form sorted data subsets. In an embodiment, sort modules 114 and 124 may sort one or more data subsets 115 and 125 using a merge sort algorithm.

In an example, each core of a computing device may be responsible for sorting one data subset. By way of example, if three cores are available and five items need to be sorted, in a first iteration, a first core may merge the first and second data items (1, 2), the core may merge the third and fourth data items (3, 4), and the third core may merge the fifth and sixth data items (5, 6). In an embodiment, multithreading may be utilized in the initial or subsequent iterations of a merge algorithm. For example, in a second iteration of a merge sort algorithm, the first core may merge (1, 2) and (3, 4) into (1, 2, 3, 4) and the second core may copy (5, 6), leaving the third core idle. In a third, and last, iteration, the first core may merge (1, 2, 3, 4) with (5, 6), while the second and third cores are idle. In another embodiment, a T-threaded M-block merge algorithm may be utilized to reduce the number of iterations required to complete a sort. In a T-threaded M-block merge algorithm, T may represent a number of threads and M may represent a number of blocks, for example. In an embodiment, either of T and M, or both, may be set to 1, however, in general a single-operation, may be with all available threads merging the remaining blocks at the end. Utilizing a T-threaded M-block merge algorithm may allow all data blocks to be merged in one step. Alternatively, in some implementations, a T-threaded M-block merge algorithm may use multi-threading, which may be used to split merging operations.

Once the data subsets 115 and 125 are sorted into a defined sorting order, computing devices 110 and computing devices 120 may be informed and search modules 116 and 126 may be used to search for a target data item from the total data set using the sorted data subsets stored on computing devices 110 and computing devices 120. Search modules 116 and 126 may be executed by processors 112 and 122 to generally perform search operations for sorted data subsets 115 and 125. Search modules 116 and 126 may utilize a nested binary search, for example, throughout the nodes of system 100 to locate the start of a data range that is responsive to a data request from requestor device 140. In some embodiments, search modules 116 and 126 may configure each node for three phases: a finding phase, an active phase, and a bracketed phase. Search modules and range searching is discussed in-depth below with respect to FIGS. 3 and 4.

In a finding phase, search modules 116 and 126 may use a binary search on each node to locate an insert location for a proposed value from a node in the active phase, described below. The finding phase may determine how many locally stored values are less than the proposed value. The number of locally lesser values may be summed and shared with computing devices 110 and computing devices 120. In this manner, computing devices 110 and computing devices 120 may determine a number of values globally less than the proposed value. If the result is less than the target, the local insert location sets the current lower bound of a bracketed range for nodes in the finding phase. If the result is greater than the target, the local insert location may be used for the upper bound of a bracketed range. The bracketed range may be used to accelerate future data retrieval searches by ignoring known incorrect values among data subsets 115 and 125.

In an active phase, search modules 116 and 126 may configure one node within computing devices 110 and computing devices 120 to propose values to the other nodes within system 100. In an embodiment, a currently active node may be the only node able to propose such values to system 100. In an embodiment, an active node may first propose a lower end of its data range, then an upper end of its data range, and then one or more values from the middle of its range. If an active node has already gone through a finding phase, with another node in active phase, the total range of values proposed by the node may be significantly reduced. In this manner, as search modules 116 and 126 proceed throughout finding and active phases, efficiencies may be gained.

A bracketed phase may be reached when a range has been reduced to zero, in other words, when the beginning of a range for a data subset is complete. In this way, a node that has entered the bracketed phase may no longer be required to perform a search of a local data subset. Instead, a node in bracketed phase may return its lowest bracketed value local location information, since this may be the greatest value known by the node to be globally less than the target value. When a global position of a bracketed value matches the target value, the search may be ended.

Some embodiments utilizing search modules 116 and 126 may locate a value immediately after an inter-value insertion point, while other embodiments may locate a value immediately before an inter-value insertion point. In an embodiment, a tie-breaker, such as a data source node number, may be used to ensure that each proposed value insertion point is between two values in a local list of values stored in a data subset. A tie may occur when a record has duplicate values for one or more relevant fields. For example, when the values for all relevant field are 1. A tie may be broken locally by ordering of records. Between nodes, a tie-breaker, such as a data node source number, may be used with either lower or higher values breaking a tie, based upon particular implementations. Of course, other values may be used as tie-breakers based upon particular implementation details.

Once data ranges have been located within one or more sorted data subsets, such as data subsets 115 and 125, send modules 128 may configure computing devices 120 to perform data forwarding 130-c between nodes. In an embodiment, computing devices 110 may be designated as merger nodes and may use merge modules 118 to merge data, as discussed below, received via data forwarding 130. Send modules 128 and merge modules 118 may be executed by processors 112 and 122 to generally perform send and merge operations for sorted data subsets 115 and 125. Computing devices 120 may be designated as sender nodes, which are configured by send modules 128 to send relevant data in a network-sensitive hierarchy, perhaps corresponding to the underlying network topology (e.g., a star configuration for a star network, or halves of a ring for a ring topology) throughout system 100. In an embodiment, the concept of a interconnected computing clusters, such as a set of computing blades within a chassis, and a network between multiple chassis may be used. For example, two or more nodes of FIG. 1 may be included within a chassis, such as chassis 150, with interconnections within the chassis, such as data forwarding 130. While two computing nodes are illustrated within chassis 150, it may be appreciated that more nodes may be included and a distributed system may include one or more chassis. Each node present within a chassis may read data from its lower neighbor in the chassis and forwards its merged data to its higher neighbor, with the lowest node in a chassis being a sender node only. The highest, or last node, in the chassis may be designated as an inter-chassis communicator node, or switch commander, which reads data from its lower neighbor as well as from a lower neighboring chassis and sends its data to a higher neighboring chassis. Alternately, hub-and-spoke designs would forward to a central merger, and a ring topology may forward left and right from a midpoint.

Turning to FIG. 1, by way of example, computing device 120-1 may be designated as a sender node and computing device 110-1 may be designated as a merger node. Computing device 120-1 may be in the same chassis as computing device 110-1, and may be lower in the hierarchy. In this example, computing device 120-1, configured by send module 128-1, may send data identified by search module 126-1 to computing device 110-1. Computing device 110-1 may perform merge operations, as discussed in more detail below, and either send merged data to higher nodes or, if it is the highest node in the chassis, act as an inter-chassis communicator node and also read data from a lower neighboring chassis and send its data to a higher neighboring chassis.

Send modules 128 may configure computing devices 120 to pack values of data subsets 125 identified by search modules 126 starting at a first value at or subsequent to a global range location into a set of buffers organized into a ring. A buffer ring is described in more detail below with respect to FIGS. 6 and 7. A buffer ring module may allow threads to communicate across a network asynchronously, or transparently overlap communications between two local threads sharing memory. A node may forward, using data forwarding 130, one or more buffer ring modules to a parent node, or node higher within a hierarchy or chassis.

Merge modules 118 may be executed by processors 112 to generally perform merge operations for sorted data subsets 115 and 125. Merge modules 118 may be arranged to perform various merge algorithms to merge some or all of sorted data subsets 115 and 125 into a final data range responsive to a data request from requestor device 140. In an example, a merge algorithm may iteratively locate a minimum data subset range across the blocks and merge accordingly. In an implementation using heaps, which may include data values rather than references to data blocks, standard heap operations of add and remove may be used to perform merge operations. Merge modules 118 may merge different amounts of data items from each of the sorted data subsets 115 and 125 depending on results from operations of search modules 126, for example.

Merge modules 118 may configure computing devices 110 to accept sorted buffer rings 117-a, which may be accepted in a read mode via data forwarding 130. Received buffer rings 117 may be repacked with additional data and subsequently forwarded to a parent node.

In an embodiment, merge modules 118 may use a T-threaded M-block merge sort, for example. First, a modified range search, as described below with respect to FIG. 4, may be performed in this embodiment. In this embodiment, each thread may assume responsibility for sorting a portion of a final set of data. A range search may be used to find a starting and ending point for each thread. In this manner, each thread may find the end of its assigned range using a single-threaded range search. In contrast to the multi-node range search, the single-thread range search may perform the operations itself and therefore may not require communications between nodes. Otherwise, the range search may operate in a manner similar to a multi-node range search. The end of each a range for each thread may be stored in a shared resource and the threads may be synchronized. In this manner, each thread may know the end of a range for a previous thread as well as the end of its own range, and may begin merging its portion of the data accordingly.

A merge operation may be performed using a heap module, described in detail below with respect to FIG. 5. A heap module may include one or more references. Each reference may correspond to a data block to be sorted. The references may include an identifying value for a data block, such as a block number. The heap module may order data blocks based upon reference values, which allows a much smaller amount of data to represent a merged data block. Further, specialized heap operations, such as a virtual add-remove, which may only requires a single iteration rather than multiple iterations.

Once data has been merged utilizing a heap module, data may be moved into a buffer ring and may subsequently be forwarded to a parent node. This forwarding operation is similar to the operation performed by send modules 128, described above. The process may continue through the hierarchy of a distributed system, such as system 100, until all merged sorted data may reach a top node, which may be responsible for final merger and formatting of the final data set and sending the final data set to requestor device 140.

Figure 2:
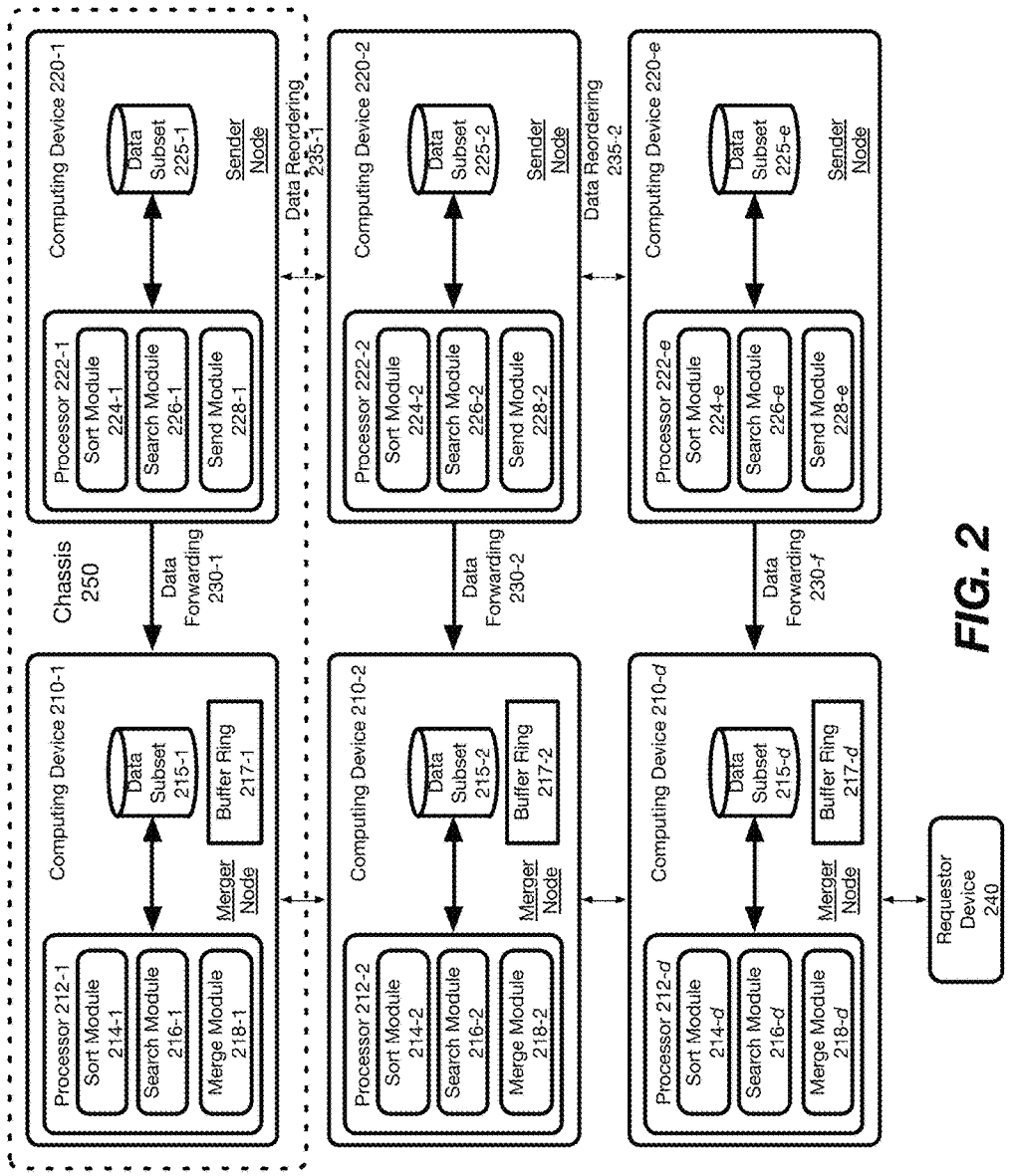
FIG. 2 illustrates an embodiment with an example of a system for data retrieval within a distributed computing environment.

FIG. 2 illustrates a block diagram for an example of a system 200 designed to implement various enhanced techniques for data retrieval within a distributed computing environment. The elements of FIG. 2 largely correspond to their counterparts as described above with respect to FIG. 1. For example, computing devices 210-*d* may correspond with computing devices 110, processors 212-*d* may correspond with processors 112, and so on. FIG. 2 does, however, add data reordering operations 235-2 between computing devices 220-1-*e*. Further, two or more nodes of FIG. 2 may be included within a chassis, such as chassis 250, with interconnections within the chassis, such as data forwarding 230. While two computing nodes are illustrated within chassis 250, it may be appreciated that more nodes may be included and a distributed system may include one or more chassis.

In some embodiments, additional reordering operations may exist between nodes, and should not be limited to those illustrated. These additional operations may allow system 200 to perform an alternative technique for data retrieval. In the case of reordering the data internally within the computing cluster as a pre-processing step or to save the data in a new set, i.e., intracluster data distribution, it may be more efficient to redistribute data within a cluster rather than forward data to a top node in the hierarchy. In this embodiment, search modules 226-*e* may search for an end range in addition to a beginning range, as discussed above and use data reordering operations between nodes to collaboratively redistribute data to the final location of that data. In an embodiment, using data reordering operations 235, computing devices 220 may be able to circumvent intermediate merger nodes (i.e., computing devices 210-1, 210-2, 210-*d*) and forward data ranges determined using search modules 226 to a top node in the hierarchy.

Figure 3:
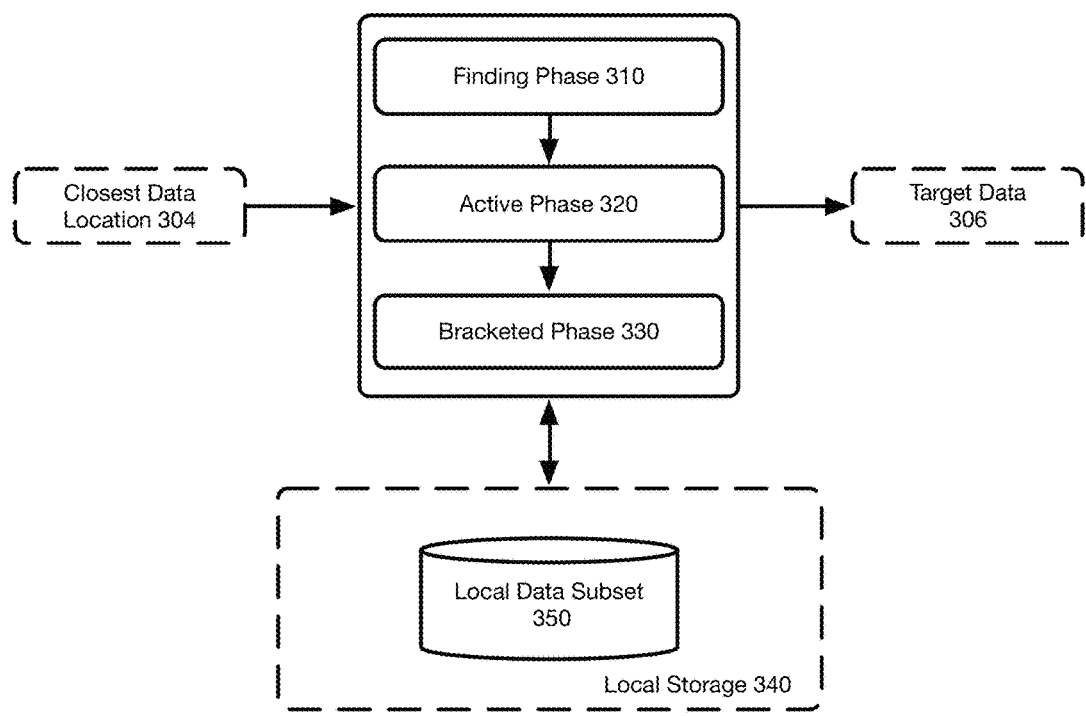
FIG. 3 illustrates an embodiment with an example of a search module for searching within a distributed computing environment.

FIG. 3 illustrates a more detailed view with an example of a search module 300, such as search modules 116 and 126, for example. Once data, such as data subsets 115 and 125, are sorted into a defined sorting order, computing devices, such as computing devices 110 and computing devices 120, may be informed and search modules, such as search module 300, may be used to search for target data 306 from a local data subset 350 in local storage 340. Search module 300 may be executed by processors, such as processors 112 and 122, to generally perform search operations for sorted data subsets, for example. Search module 300 may utilize a search, such as a nested binary search, throughout the nodes of a distributed computing system, such as system 100, to locate the start of a data range that is responsive to a data request from requestor device. Search module 300 may receive as input a closest data location 304, which may identify target data 306 based upon a data request from a requestor device. Search module 300 then may configure each node for three phases: a finding phase 310, an active phase 320, and a bracketed phase 330.

In a finding phase 310, search module 300 may use a search, such as a binary search on each node, to locate an insert location for a proposed value from a node in the active phase, which is described below. The finding phase may determine how many locally stored values are less than the proposed value. The number of locally lesser values may be summed and shared with other computing devices. In this manner, the other computing devices in a distributed system may determine a number of values globally less than the proposed value. If the result is less than the target, the local insert location sets the current lower bound of a bracketed range for nodes in the finding phase. If the result is greater than the target, the local insert location may be used for the upper bound of a bracketed range. The bracketed range may be used to accelerate future data retrieval searches by ignoring known incorrect values among available data subsets.

In an active phase 320, search modules, such as 116 and 126, may configure one node within computing devices, such as 110 and 120, to propose values to the other nodes within a distributed system. In an embodiment, a currently active node may be the only node able to propose such values to system 100. In an embodiment, an active node may first propose a lower end of its data range, then an upper end of its data range, and then values from the middle of its range. If an active node has already gone through a finding phase, with another node in active phase, the total range of values proposed by the node may be significantly reduced. In this manner, as search modules proceed throughout finding and active phases, efficiencies may be gained.

A bracketed phase 330 may be reached when a range has been reduced to zero. In this way, a node that has entered the bracketed phase may no longer be required to perform a search of a local data subset. Instead, a node in bracketed phase may return its lowest bracketed value local location information, since this may be the greatest value known by the node to be globally less than the target value. When a global position of a bracketed value matches the target value, the search may be ended and target data 306 may be returned.

Some embodiments utilizing search module 300 may locate a value immediately after an inter-value insertion point, while other embodiments may locate a value immediately before an inter-value insertion point. In an embodiment, a tie-breaker, such as a data source node number, may be used to ensure that each proposed value insertion point is between two values in a local list of values stored in a data subset. Of course, other values may be used as tie-breakers based upon particular implementation details.

Figure 4:
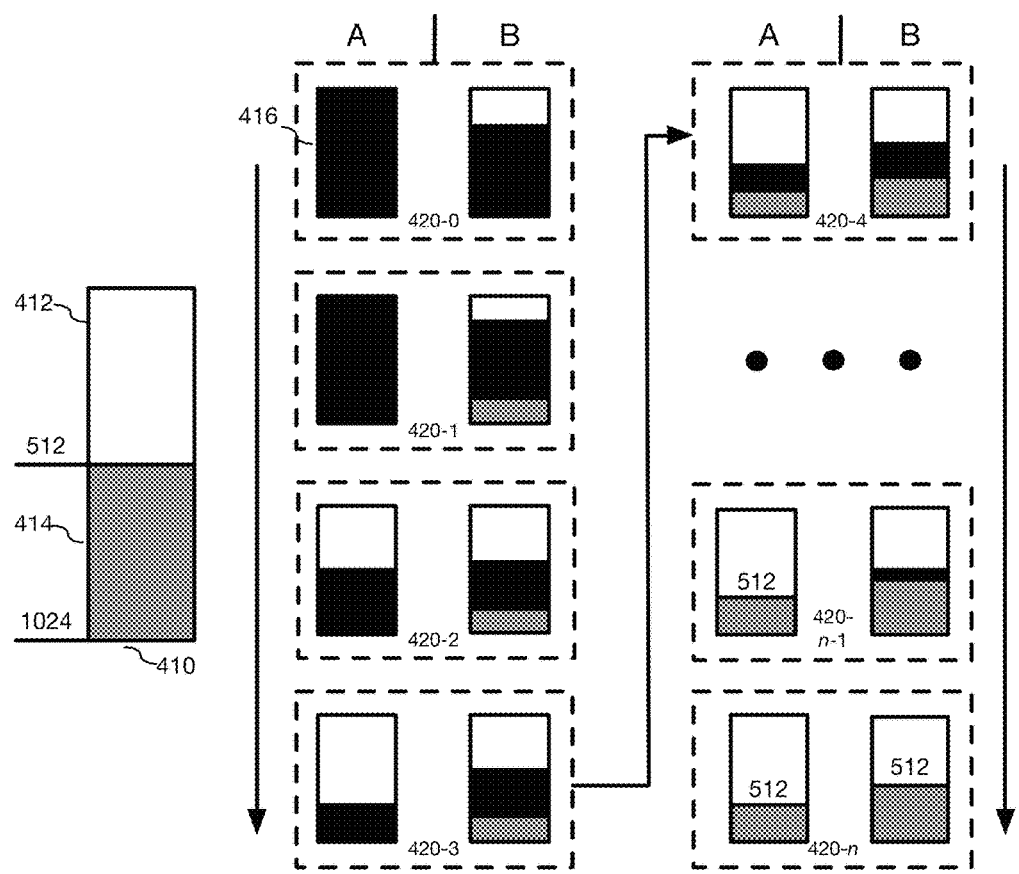
FIG. 4 illustrates an embodiment with an example of a range search, which may be performed by a search module within a distributed computing environment.

FIG. 4 illustrates an example of a range search 400 of data blocks according to an embodiment. In the example illustrated within FIG. 4, a total range 410 may be 0-1024, and a target value may be 512, for example. The white portion 412 of range 410 represents a top half of a final ordered data set. The gray portion 414 of range 410 represents a bottom half of a final ordered data set. Black areas, such as area 416, represent data ranges where a global assignment of the data is unknown. In some embodiments, a range search may be performed by a single thread, however, a clustered version of a range search may assign a block to a compute node. As illustrated, iterations 420-$n$ (e.g., comparing with respect to the requested range start) are used to identify the value 512 within the data blocks.

In an embodiment, a finding phase may be represented by data blocks in column A and an active phase may be represented by blocks in column B. In a finding phase, a search module may use a search, such as a binary search, on each node to locate an insert location for a proposed value from a node in the active phase. The finding phase may determine how many locally stored values are less than the proposed value. The number of locally lesser values may be summed and shared with other computing devices. In this manner, the other computing devices in a distributed system may determine a number of values that are globally less than the proposed value. If the result is less than the target, the local insert location sets the current lower bound of a bracketed range for nodes in the finding phase. If the result is greater than the target, the local insert location may be used for the upper bound of a bracketed range. The bracketed range may be used to accelerate future data retrieval searches by ignoring known incorrect values among available data subsets.

In an active phase, search modules, such as 116 and 126, may configure one node within computing devices, such as 110 and 120, to propose values to the other nodes within a distributed system. In an embodiment, a currently active node may be the only node able to propose such values to a distributed system. In an embodiment, an active node may first propose a lower end of its data range, then an upper end of its data range, and then values from the middle of its range. If an active node has already gone through a finding phase, with another node in active phase, the total range of values proposed by the node may be significantly reduced. In this manner, as search modules proceed throughout finding and active phases, efficiencies are gained.

Figure 5:
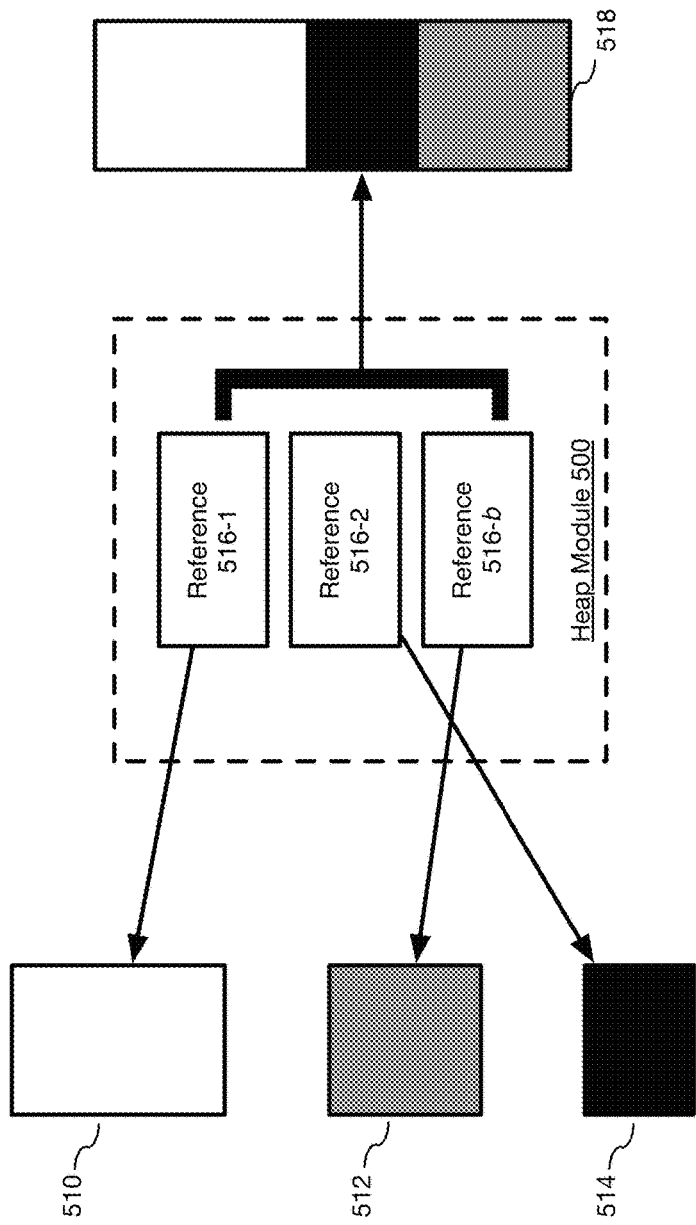
FIG. 5 illustrates an embodiment with an example of a heap module, which may be used to order data within a distributed computing environment.

FIG. 5 illustrates an example of a heap module 500 according to an embodiment. Heap module 500 may be executed by processors, such as processors 112, to generally perform merge operations for sorted data subsets 115 and 125. Heap module 500 may be utilized by merge modules, such as 118, to perform merge operations. Heap module 500 may include one or more references 516-$g$. Each reference value 516 may correspond to a data block to be sorted. Reference values 516 may include an identifying value for a data block, such as a block number. Heap module 500 may order data blocks 510, 512, 514 based upon reference values 516, which allows a much smaller amount of data to represent a merged data block. For example, only reference values, and not the data itself, may be required to merge sorted data into sorted data block 518.

Figure 6:
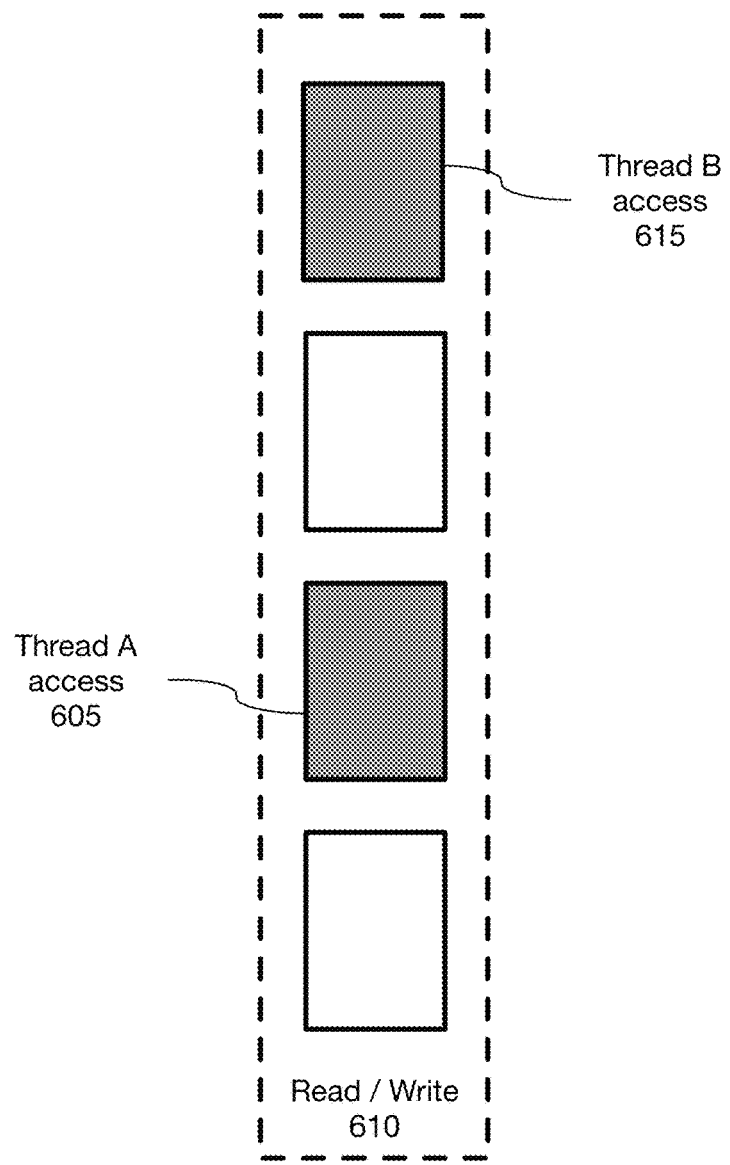
FIG. 6 illustrates an embodiment with an example of a buffer ring module, which may be used for buffering data during one or more data retrieval operations within a distributed computing environment.

FIG. 6 illustrates an example of a buffer ring module 600 according to an embodiment. Buffer ring module 600 may be executed by processors, such as processors 112, to generally perform merge operations for sorted data subsets 115 and 125. Buffer ring module 600 may be used in conjunction with send modules 128, for example, which may configure computing devices 120 to pack values of data subsets 125 identified by search modules 126, starting at a first value at or subsequent to a global range location, into a set of buffers organized into a ring. Buffer ring module 600 may allow threads to synchronize local and remote asynchronous communication. A node may forward one or more buffer ring modules to a parent node, or node higher within a hierarchy or chassis.

In an embodiment, buffer ring module 600 may be used for background communications between computing devices, or to synchronize buffer usage between threads on the same computing device. Buffer ring module 600, as shown, includes a single read/write portion 610 and a plurality of data blocks. As illustrated, the white boxes may be areas that neither thread is actively using and the shaded boxes may be in active use. A first thread A may access a portion at 605. A second thread B may access another portion at 615. To avoid conflict, threads A and B may first wait for a communication from the other thread notifying threads A and B that the other thread is done accessing the buffer. In this manner, data may be written to a buffer by one thread at the same time that data is being read from the buffer by another thread.

Figure 7:
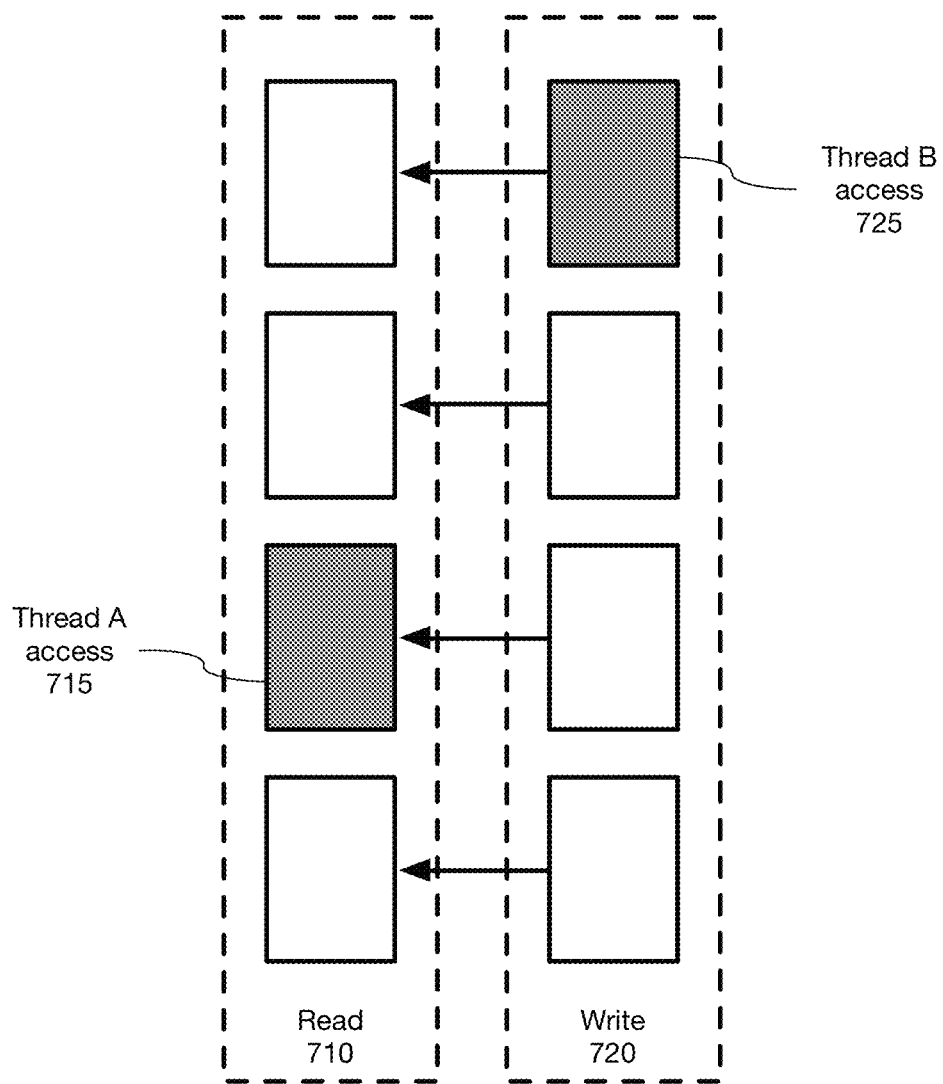
FIG. 7 illustrates an embodiment with an example of a buffer ring module, which may be used for buffering data during one or more data retrieval operations within a distributed computing environment.

FIG. 7 illustrates an example of a buffer ring module 700 according to an embodiment. Buffer ring module 700 may be executed by processors, such as processors 112, to generally perform merge operations for sorted data subsets 115 and 125. Buffer ring module 700 may be used in conjunction with send modules 128, for example, which may configure computing devices 120 to pack values of data subsets 125 identified by search modules 126, starting at a first value at or subsequent to a global range location, into a set of buffers organized into a ring. Buffer ring module 700 may allow threads to synchronize local and remote asynchronous communication, for example by blocking on a mutex. A node may forward data via one or more buffer ring modules to a parent node, or a node higher within a hierarchy.

In an embodiment, buffer ring module 700 may be used for background communications between computing devices, or to synchronize buffer usage between threads on the same computing device. Buffer ring module 700, as shown, includes a write portion 710 and a read portion 720. As illustrated, the white boxes may be areas that neither thread is actively using and the shaded boxes may be in active use. A first thread A may access the read portion 710 at 715. At the same time, a second thread B may access the write portion at 725. In this manner, data may be written to a buffer by one thread at the same time that data is being read from the buffer by another thread. To avoid conflict, buffers may employ communication methods such locks or semaphores.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). For example, a logic flow may be implemented by a processor component executing instructions stored on an article of manufacture, such as a storage medium. A storage medium may include any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 8:
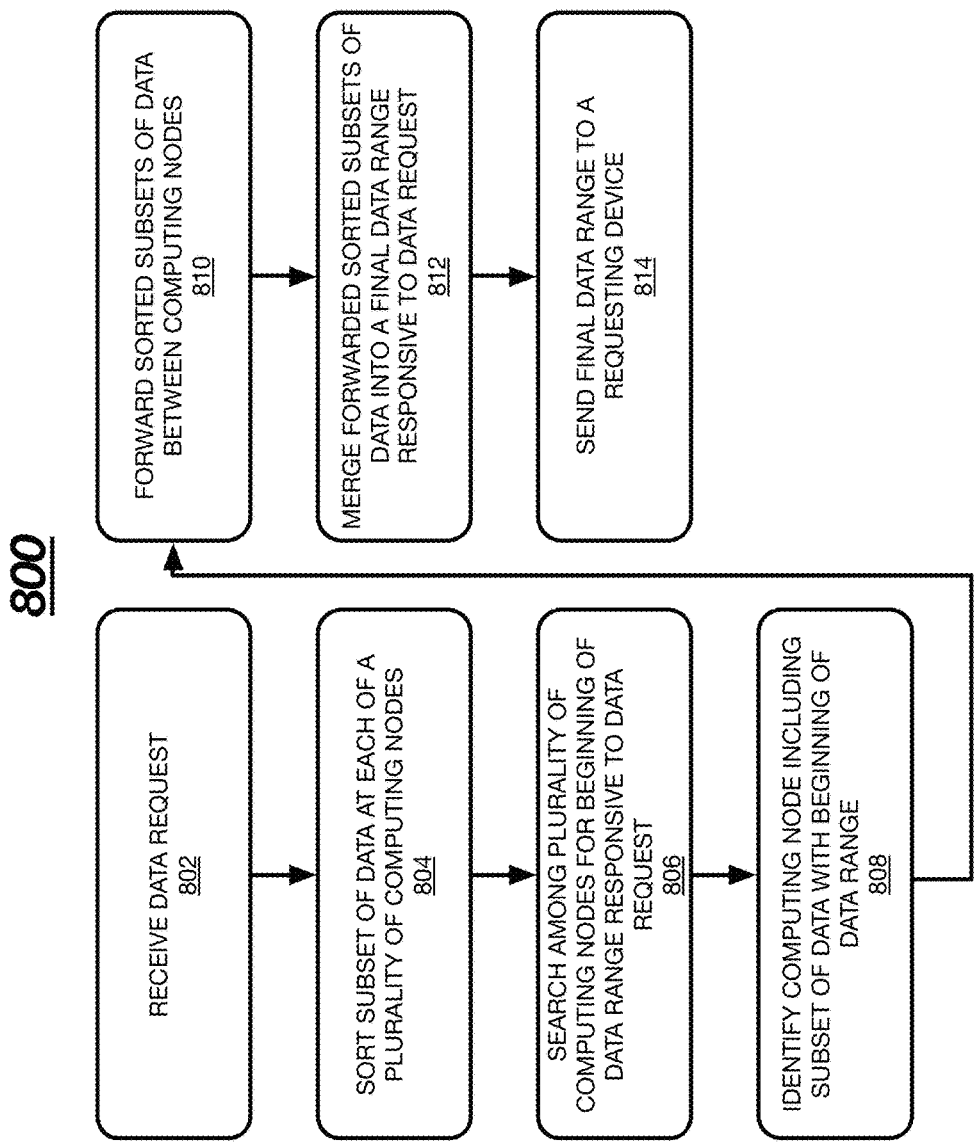
FIG. 8 illustrates an embodiment with an example of a logic flow for data retrieval within a distributed computing environment.

FIG. 8 illustrates one embodiment with an example of a logic flow 800. The logic flow 800 may be representative of some or all of the operations executed by one or more embodiments described herein. For instance, the logic flow 800 may be representative of some or all of the operations executed by computing devices 110 and 120.

Logic flow 800 may receive a data request at 802. A data request may be received by a distributed computing system, such as system 100, from a requestor device. Once a request for data has been received, logic flow 800 may locally sort a subset of data at each of a plurality of computing nodes at 804. More particularly, sort modules, such as 114 and 124, may sort one or more data subsets, such as 115 and 125, into some defined order in one or more data sorting sessions, as described above with respect to FIG. 1.

At 806, once the data subsets are sorted into a defined sorting order, one or more computing devices may be informed and search modules, such as 116 and 126, may be used to search among the computing nodes for a beginning of a data range responsive to the data request. Search modules, such as 116 and 126, may be executed by processors, such as 112 and 122, to generally perform search operations in sorted data subsets. Search modules may configure each computing node for three phases: a finding phase, an active phase, and a bracketed phase. Search modules and range searching is discussed in-depth above with respect to FIGS. 3 and 4.

At 808, search modules may utilize a search, such as nested binary search, throughout the nodes of a distributed system to identify a computing node including a subset of data with the start of a data range that is responsive to a data request from a requestor device.

At 810, once data ranges have been located within one or more sorted data subsets, such as data subsets 115 and 125, send modules may configure computing devices to perform data forwarding between computing nodes. In an embodiment, some computing devices may be designated as merger nodes and may use merge modules to merge data, as discussed above, received via data forwarding. Other computing devices may be designated as sender nodes, which are configured by send modules to send relevant data in a network-sensitive hierarchy. In an embodiment, the concept of a chassis and inter-chassis interconnect may be used. Here, each node present within a chassis may read data from its lower neighbor in the chassis and forwards its merged data to its higher neighbor, with the lowest node in a chassis being a sender node only. The highest, or last node, in the chassis may be designated as an inter-chassis communicator node, or switch commander, which reads data from its lower neighbor as well as from a lower neighboring chassis and sends its data to a higher neighboring chassis.

At 812, merge modules may be executed by processors to merge forwarded sorted subsets of data into a final data range responsive to the data request. Merge modules may be arranged to perform various merge algorithms to merge some or all of sorted data subsets into a final data range responsive to a data request from requestor device. Merge modules may merge different amounts of data items from each of the sorted data subsets depending on results from operations of search modules, for example.

Merge modules may configure computing devices to accept sorted buffer rings. In an embodiment, merge modules may use a T-threaded M-block merge sort, for example. First, a modified range search, as described above with respect to FIG. 4, may be performed in this embodiment. Rather than searching an entire cluster of nodes, a modified range search may use a single thread to search data block-by-block. A global start position bracketing may be transformed from per node to per block, which may be an individual data block within a data subset within a node. Each thread may be responsible for 1/T of a final merged data range, for example. Further, each thread may perform a range search for the end of its range with each block corresponding to two buffers from each data source to ensure sufficient data for one output buffer ring. After all threads have completed, each thread may read the start of their range from shared memory and begin merging block ranges that they are responsible for.

A merge operation may be performed using a heap module, described in detail above with respect to FIG. 5. A heap module may include one or more references. Each reference may correspond to a data block to be sorted. The references may include an identifying value for a data block, such as a block number. The heap module may order data blocks based upon reference values, which allows a much smaller amount of data to represent a merged data block. Further, specialized heap operations, such as a virtual add-remove, which only requires a single operation rather than multiple operations (e.g., an add and remove).

Once data has been merged utilizing a heap module, data may be moved into a buffer ring and may subsequently be forwarded to a parent node. This forwarding operation is similar to the operation performed by send modules 128 above. The process may continue through the hierarchy of a distributed system, such as system 100, until all merged sorted data may reach a top node, which may be responsible for final merger and formatting of the final data set and sending the final data set to requestor device at 814.

Figure 9:
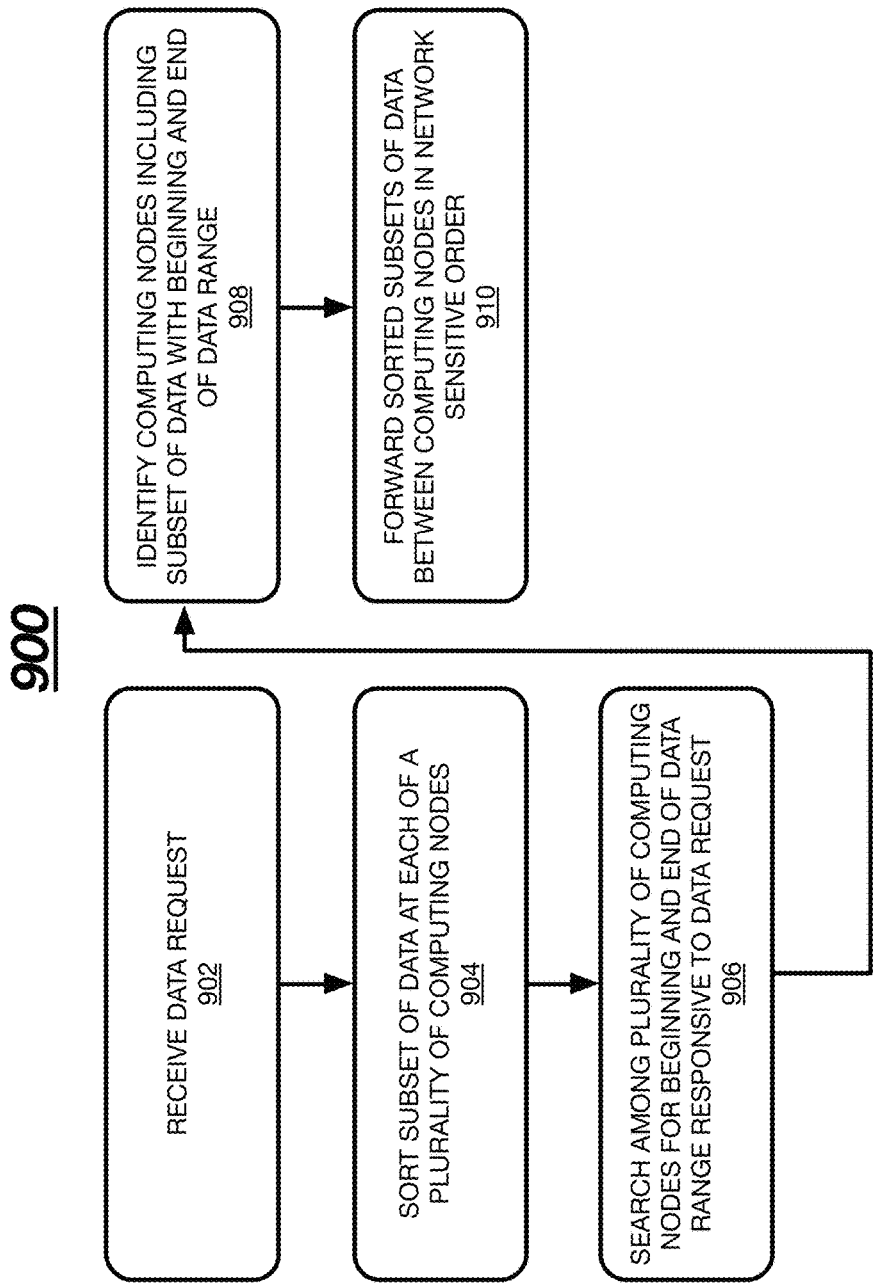
FIG. 9 illustrates an embodiment with an example of a logic flow for data retrieval within a distributed computing environment.

FIG. 9 illustrates one embodiment with an example of a logic flow 900. The logic flow 900 may be representative of some or all of the operations executed by one or more embodiments described herein. For instance, the logic flow 900 may be representative of some or all of the operations executed by computing devices 110 and 120.

Logic flow 900 may receive a data request at 902. A data request may be received by a distributed computing system, such as system 100, from a requestor device. Once a request for data has been received, logic flow 900 may sort a subset of data at each of a plurality of computing nodes at 904. More particularly, sort modules, such as 114 and 124, may sort one or more data subsets, such as 115 and 125, into some defined sorting order in one or more data sorting sessions, as described above with respect to FIG. 1.

At 906, once the data subsets are sorted into a defined sorting order, one or more computing devices may be informed and search modules, such as 116 and 126, may be used to search among the plurality of computing nodes for a beginning of a data range responsive to the data request. Search modules, such as 116 and 126, may be executed by processors, such as 112 and 122, to generally perform search operations for sorted data subsets. Search modules may configure each computing node for three phases: a finding phase, an active phase, and a bracketed phase. Search modules and range searching is discussed in-depth above with respect to FIGS. 3 and 4.

At 908, search modules may utilize a search, such as a nested binary search, throughout the nodes of a distributed system to identify a computing node including a subset of data with the start of a data range that is responsive to a data request from a requestor device.

At 910, once data ranges have been located within one or more sorted data subsets, such as data subsets 115 and 125, send modules may configure computing devices to perform data forwarding between computing nodes in network-sensitive order using alternative technique for data retrieval. In some intra-cluster data distribution use cases and implementations, it may be more efficient to redistribute data within a cluster rather than forward data to a top node in the hierarchy. In this embodiment, search modules may search for an end range in addition to a beginning range, as discussed above and use data reordering operations between nodes to collaboratively redistribute data. In an embodiment, using data reordering operations, computing devices may be able to circumvent intermediate merger nodes and forward data ranges determined using search modules to a top node in the hierarchy.

Figure 10:
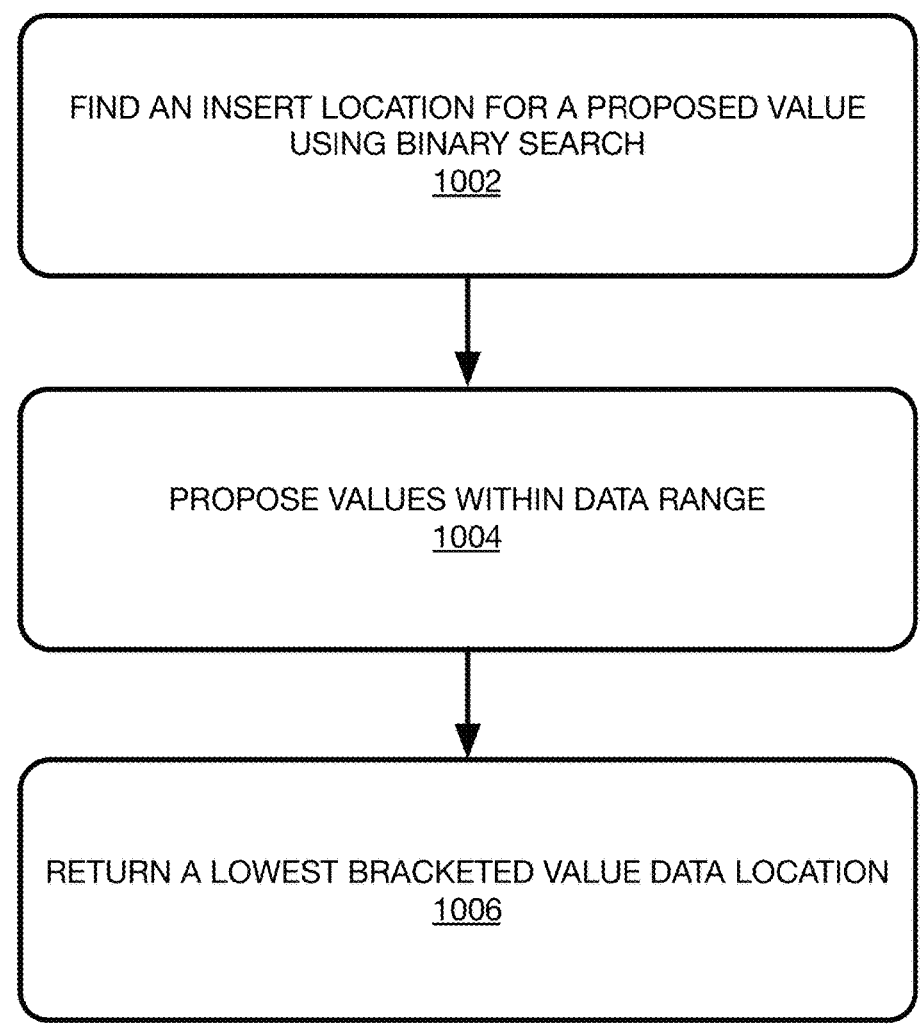
FIG. 10 illustrates an embodiment with an example of a logic flow for a search module within a distributed computing environment.

FIG. 10 illustrates one embodiment with an example of a logic flow 1000. The logic flow 1000 may be representative of some or all of the operations executed by one or more embodiments described herein. For instance, the logic flow 1000 may be representative of some or all of the operations executed by search modules executed on computing devices 110 and 120.

At 1002, in a finding phase, a search module may use a search, such as a binary search, on each node to locate an insert location for a proposed value from a node in the active phase, described below. The finding phase may determine how many locally stored values are less than the proposed value. The number of locally lesser values may be summed and shared with other computing devices. In this manner, the other computing devices in a distributed system may determine a number of values that are globally less than the proposed value. If the result is less than the target, the local insert location sets the current lower bound of a bracketed range for nodes in the finding phase. If the result is greater than the target, the local insert location may be used for the upper bound of a bracketed range. The bracketed range may be used to accelerate future data retrieval searches by ignoring known incorrect values among available data subsets.

At 1004, in an active phase, search modules, such as 116 and 126, may configure one node within computing devices, such as 110 and 120, to propose values to the other nodes within a distributed system. In an embodiment, a currently active node may be the only node able to propose such values to a distributed system. In an embodiment, an active node may first propose a lower end of its data range, then an upper end of its data range, and then values from the middle of its range. If an active node has already gone through a finding phase, with another node in active phase, the total range of values proposed by the node may be significantly reduced. In this manner, as search modules proceed throughout finding and active phases, efficiencies are gained.

At 1006, a lowest bracket value data location may be returned by a bracketed phase, which may be reached when a range has been reduced to zero. In this way, a node that has entered the bracketed phase may no longer be required to perform a search of a local data subset. Instead, a node in bracketed phase may return its lowest bracketed value local location information, since this may be the greatest value known by the node to be globally less than the target value. When a global position of a bracketed value matches the target value, the search may be ended and target data 306 may be returned.

Figure 11:
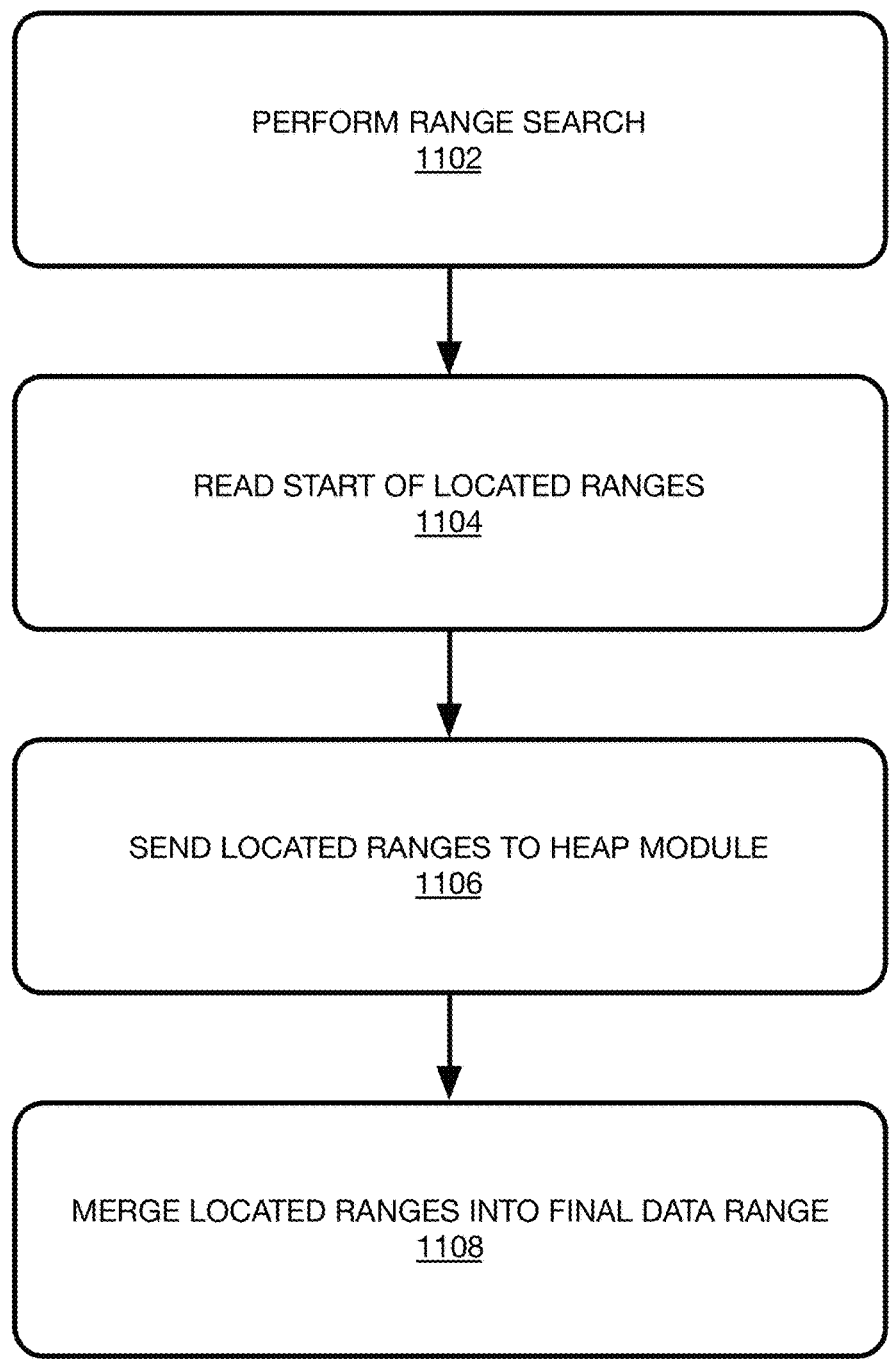
FIG. 11 illustrates an embodiment with an example of a logic flow for a merge module within a distributed computing environment.

FIG. 11 illustrates one embodiment with an example of a logic flow 1100. The logic flow 1100 may be representative of some or all of the operations executed by one or more embodiments described herein. For instance, the logic flow 1100 may be representative of some or all of the operations executed by merge modules executed on computing devices 110.

At 1102, a modified range search, as described above with respect to FIG. 4, may be performed. Rather than searching an entire cluster of nodes, a modified range search may use a single thread to search data block-by-block. A global start position bracketing may be transformed from per node to per block, which may be an individual data block within a data subset within a node. Each thread may be responsible for 1/T of a final merged data range. Further, each thread may perform a range search for the end of its range with each block corresponding to two buffers from each data source to ensure sufficient data for one output buffer ring.

At 1104, after all threads have completed, each thread may read the start of their range from shared memory and begin merging block ranges that they are responsible for.

At 1106, a merge operation may be performed using a heap module, described in detail above with respect to FIG. 5. A heap module may include one or more references. Each reference may correspond to a data block to be sorted. The references may include an identifying value for a data block, such as a block number. The heap module may order data blocks based upon reference values, which allows a much smaller amount of data to represent a merged data block. Further, specialized heap operations, such as a virtual add-remove, which only requires a single operation rather than multiple iterations.

Figure 12:
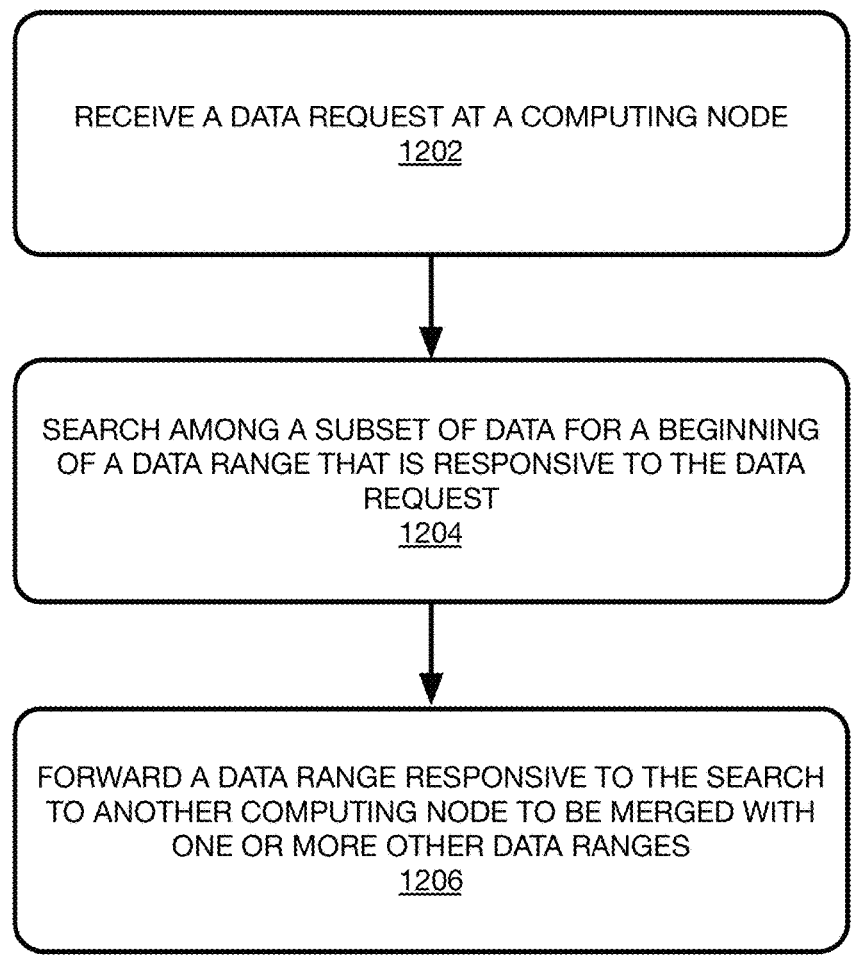
FIG. 12 illustrates an embodiment with an example of a logic flow for data retrieval within a distributed computing environment.

FIG. 12 illustrates one embodiment with an example of a logic flow 1200. The logic flow 1200 may be representative of some or all of the operations executed by one or more embodiments described herein. For instance, the logic flow 1200 may be representative of some or all of the operations executed by one of computing devices 120 of FIG. 1, for example.

At 1202, a data request may be received at a computing node. At 1204, a search module, such as search module 126, may search among a subset of data stored, or available, to the computing node for a range of data responsive to the data request. In an example, the search may identify a beginning of a data range that is responsive to the data request. In some embodiments, a search module may configure a computing node for three phases: a finding phase, an active phase, and a bracketed phase, as described above. A search modules may utilize a search, such as nested binary search, for example.

At 1206, a send module, such as send module 128, may forward a data range that is responsive to the search to another computing node of a distributed system. For example, a responsive data range may be sent from a computing node 120 using data forwarding 130 to another computing node 110. The data responsive data range may be forwarded so that the data range may be merged, by a merge module, with other responsive data ranges. Merge modules may be executed by processors to merge forwarded sorted subsets of data into a final data range responsive to the data request. Merge modules may be arranged to perform various merge algorithms to merge some or all of sorted data subsets into a final data range responsive to a data request from requestor device. Merge modules may merge different amounts of data items from each of the sorted data subsets depending on results from operations of search modules, for example.

Once data has been merged utilizing a heap module, data may be moved into a buffer ring and may subsequently be forwarded to a parent node. This forwarding operation is similar to the operation performed by send modules 128, discussed above with respect to FIG. 1. The process may continue through the hierarchy of a distributed system, such as system 100, until all merged sorted data may reach a top node, which may be responsible for final merger and formatting of the final data set and sending the final data set to requestor devices.

Figure 13:
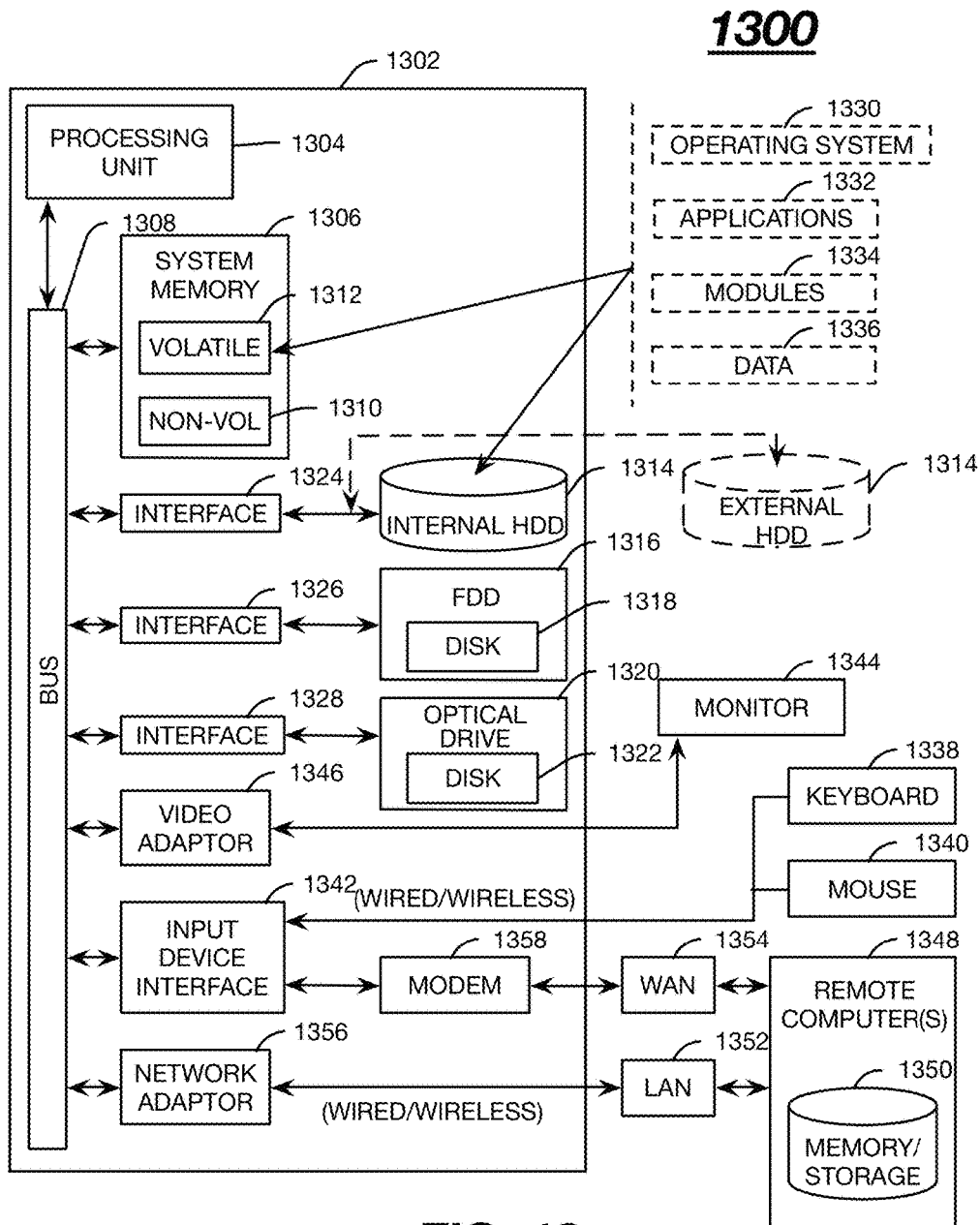
FIG. 13 illustrates an embodiment with an example of a computing architecture.

FIG. 13 illustrates an embodiment of an exemplary computing architecture 1300 suitable for implementing various embodiments as previously described. The computing architecture 1300 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1300.

As shown in FIG. 13, the computing architecture 1300 includes a processing unit 1304, a system memory 1306 and a system bus 1308. The processing unit 1304 can be any of various commercially available processors. Dual microprocessors and other multi-processor architectures may also be employed as the processing unit 1304. The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures.

The system memory 1306 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 13, the system memory 1206 can include non-volatile memory 1310 and/or volatile memory 1312. A basic input/output system (BIOS) can be stored in the non-volatile memory 1310.

The computer 1302 may include various types of computer-readable storage media, including an internal hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. The one or more application programs 1332, other program modules 1334, and program data 1336 can include, for example, sort modules 114 and 124, search modules 116 and 126, merge modules 118, and send modules 128, among others.

A user can enter commands and information into the computer 1302 through one or more wire/wireless input devices, for example, a keyboard 1338 and a pointing device, such as a mouse 1340. Other input devices may include a microphone, an infrared (IR) remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1708 via an interface, such as a video adaptor 1346. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 14:
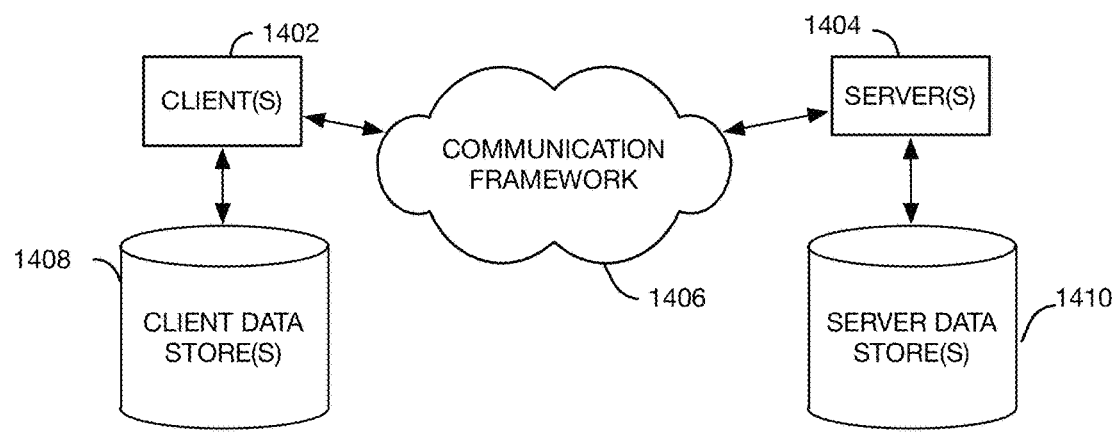
FIG. 14 illustrates an embodiment with an example of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, and so forth. The embodiments, however, are not limited to implementation by the communications architecture 1400.

As shown in FIG. 14, the communications architecture 1400 includes one or more clients 1402 and servers 1404. The clients 1402 may implement the requestor device 140. The servers 1404 may implement the computing devices 110 and 120. The clients 1402 and the servers 1304 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 1402 and the servers 1404 may include various types of standard communication elements designed to be interoperable with the communications framework 1406, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated transmissions, and so forth. Examples of wireless communications media may include acoustic, radio-frequency (RF) spectrum, infrared and other wireless media. One possible communication between a client 1402 and a server 1404 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be implemented using one or more systems used with SAS Institute Inc., such as LASR, HADOOP®, or other big data, or grid computing platforms like SAS GRID MANAGER. For example, SAS LASR may run on industry-standard blade servers, and may quickly read data into memory for fast processing where the data becomes available for visualization. Hadoop® is an open-source programming framework that allows data to be spread over large clusters of commodity servers and processed in parallel. In addition, the software also detects and handles failures, which is critical for distributed processing. In other embodiments, SAS GRID MANAGER may automatically use a centrally managed grid computing infrastructure to provide workload balancing, high availability and parallel processing for business analytics jobs and processes. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop®, for example, is an open-source software framework for distributed computing.

Some embodiments may include an article of manufacture. An article of manufacture may include a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 312 C.F.R. Section 1.152(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine-readable storage medium comprising instructions that, when executed by a processor, cause the processor to:
   receive a data request at a computing node of a distributed computing system to store a set of data, the computing node including a subset of data of the set of data;
   sort the subset of data into a defined order via one or more data sorting sessions;
   iteratively search among the sorted subset of data for a targeted beginning location of a data range that is responsive to the data request, each iteration to:
      receive a proposed value of one or more proposed values from one of a plurality of computing nodes of the distributed computing system, the proposed value used to search for the beginning location of the data range,
      utilize a binary search to locate a local insert location for the proposed value, the local insert location local to the subset of data of the computing node, the binary search to:
         determine a first sum value of locally stored values indicating a number of locally stored values that are less than the proposed value stored on the computing node,
         determine a second sum value of globally stored values less than the proposed value, wherein the globally stored values are values stored on the distributed computing system and the second sum value to include a summation of a number of values stored on other computing nodes of the distributed computing system and the first sum value,
         determine whether the second sum value is less than, equal to, or greater than the targeted beginning location,
         based on determining the second sum value is less than the targeted beginning location, the local insert location is set as a current lower bound of a bracketed range, and
         based on determining the second sum value is greater than the targeted beginning location, the local insert location is set as an upper bound of the bracketed range, and
         based on determining that the second sum value equals the targeted beginning location, set the local insert location to be the targeted beginning location, and cease searching among the sorted subset of data,
      share, by the computing node, a location of a greatest local value known to be less than the proposed value with the other computing nodes within the distributed system,
      cease searching among the sorted subset of data when the bracketed range equals zero, and determine, during at least one of the iterations, one of the one or more proposed values and share the one of the one or more proposed values with other computing nodes within the distributed computing system; and forward, from the computing node, data responsive to the search to another computing node of the distributed computing system to be merged with one or more other data from one or more other computing nodes.

2. The at least one non-transitory machine-readable storage medium of claim 1, further comprising instructions that, when executed by the processor, cause the processor to sort the subset of data using a merge sort algorithm.

3. The at least one non-transitory machine-readable storage medium of claim 1, further comprising instructions that, when executed by the processor, cause the processor to sort the subset of data using a T-threaded M-block merge algorithm.

4. The at least one non-transitory machine-readable storage medium of claim 1, wherein the computing node is labeled as a sender node or a merger node.

5. The at least one non-transitory machine-readable storage medium of claim 1, wherein the computing node is configured to forward data using a buffer ring.

6. The at least one non-transitory machine-readable storage medium of claim 1, wherein the forwarding is performed using a heap component utilizing references to one or more blocks of data.

7. The at least one non-transitory machine-readable storage medium of claim 1, wherein a tie-breaker is used to ensure that the one of the one or more proposed values is between two values in a local list of values.

8. A computer-implemented method, comprising:
receive a data request at a computing node of a distributed computing system to store a set of data, the computing node including a subset of data of the set of data;
sorting the subset of data into a defined order via one or more data sorting sessions;
iteratively searching among the sorted subset of data for a targeted beginning location of a data range that is responsive to the data request, each iteration to include:
receiving a proposed value of one or more proposed values from one of a plurality of computing nodes of the distributed computing system, the proposed value used to search for the beginning location of the data range,
utilizing a binary search to locate a local insert location for the proposed value, the local insert location local to the subset of data of the computing node, the binary search including:
determining a first sum value of locally stored values indicating a number of locally stored values that are less than the proposed value stored on the computing node,
determining a second sum value of globally stored values less than the proposed value, wherein the globally stored values are values stored on the distributed computing system and the second sum value to include a summation of a number of values stored on other computing nodes of the distributed computing system and the first sum value,
determining whether the second sum value is less than, equal to, or greater than the targeted beginning location, based on determining the second sum value is less than the targeted beginning location, the local insert location is set as a current lower bound of a bracketed range, and based on determining the second sum value is greater than the targeted beginning location, the local insert location is set as an upper bound of the bracketed range, and based on determining that the second sum value equals the targeted beginning location, set the local insert location to be the targeted beginning location, and cease searching among the sorted subset of data, sharing, by the computing node, a location of a greatest local value known to be less than the proposed value with the other computing nodes within the distributed system and cease searching among the sorted subset of data when the bracketed range equals zero, determining, during at least one of the iterations, one of the one or more proposed values and share the one of the one or more proposed values with other computing nodes within the distributed computing system; and forwarding, from the computing node, data responsive to the search to another computing node of the distributed computing system to be merged with one or more other data from one or more other computing nodes.

9. The computer-implemented method of claim 8, wherein the subset of data is sorted using a merge sort algorithm.

10. The computer-implemented method of claim 8, wherein the subset of data is sorted using a T-threaded M-block merge algorithm.

11. The computer-implemented method of claim 8, wherein the computing node is labeled as a sender node or a merger node.

12. The computer-implemented method of claim 8, wherein the forwarding is performed using a buffer ring.

13. The computer-implemented method of claim 8, wherein the forwarding is performed using a heap component utilizing references to one or more blocks of data.

14. The computer-implemented method of claim 8, wherein a tie-breaker is used to ensure that the one of the one or more proposed values is between two values in a local list of values.

15. An apparatus, comprising:
a processor;
a memory unit communicatively coupled to the processor; and
logic, at least partially implemented by the processor, the logic to:
receive a data request at a computing node of a distributed computing system to store a set of data, the computing node including a subset of data of the set of data,
sort the subset of data into a defined order via one or more data sorting sessions,
iteratively search among the sorted subset of data for a targeted beginning location of a data range that is responsive to the data request, each iteration to:
receive a proposed value of one or more proposed values from one of a plurality of computing nodes of the distributed computing system, the proposed value used to search for the beginning location of the data range, utilize a binary search to locate a local insert location for the proposed value, the local insert location local to the subset of data of the computing node, the binary search to:
  determine a first sum value of locally stored values indicating a number of locally stored values that are less than the proposed value stored on the computing node,
  determine a second sum value of globally stored values less than the proposed value, wherein the globally stored values are values stored on the distributed computing system and the second sum value to include a summation of a number of values stored on other computing nodes of the distributed computing system and the first sum value,
  determine whether the second sum value is less than, equal to, or greater than the targeted beginning location,
  based on determining the second sum value is less than the targeted beginning location, the local insert location is set as a current lower bound of a bracketed range, and
  based on determining the second sum value is greater than the targeted beginning location, the local insert location is set as an upper bound of the bracketed range, and
  based on determining that the second sum value equals the targeted beginning location, set the local insert location to be the targeted beginning location, and cease searching among the sorted subset of data,
share, by the computing node, a location of a greatest local value known to be less than the proposed value with the other computing nodes within the distributed system and cease searching among the sorted subset of data when the bracketed range equals zero, and
determine, during at least one of the iterations, one of the one or more proposed values and share the one of the one or more proposed values with other computing nodes within the distributed computing system; and
forward, from the computing node, data responsive to the search to another computing node of the distributed computing system to be merged with one or more other data from one or more other computing nodes.

16. The apparatus of claim 15, the logic to sort the subset of data using a merge sort algorithm.

17. The apparatus of claim 15, the logic to sort the subset of data using a T-threaded M-block merge algorithm.

18. The apparatus of claim 15, wherein the computing node is labeled as a sender node or a merger node.

19. The apparatus of claim 15, wherein the computing node is configured to forward data using a buffer ring.

20. The apparatus of claim 15, the logic to forward using a heap component utilizing references to one or more blocks of data.

21. The apparatus of claim 15, the logic to use a tie-breaker is used to ensure that the one of the one or more proposed values is between two values in a local list of values.

22. At least one non-transitory machine-readable storage medium comprising instructions that, when executed by a computing device, cause the computing device to:

receive a data request at a distributed computing system including a plurality of computing nodes, each computing node including a subset of data of a set of data stored by the distributed computing system;
cause each computing node to sort each subset of data into a defined order via one or more data sorting sessions;
cause each of the plurality of computing nodes to iteratively search among the sorted subset of data for a targeted beginning location of a data range that is responsive to the data request, each iteration to:
  receive a proposed value of one or more proposed values from one of the plurality of computing nodes of the distributed computing system, the proposed value used to search for the beginning location of the data range,
  utilize a binary search to locate a local insert location for the proposed value, the local insert location local to the subset of data of a computing node, the binary search to:
    determine a first sum value of locally stored values indicating a number of locally stored values that are less than the proposed value stored on the computing node,
    determine a second sum value of globally stored values less than the proposed value, wherein the globally stored values are values stored on the distributed computing system and the second sum value to include a summation of a number of values stored on other computing nodes of the distributed computing system and the first sum value,
    determine whether the second sum value is less than, equal to, or greater than the targeted beginning location,
    based on determining the second sum value is less than the targeted beginning location, the local insert location is set as a current lower bound of a bracketed range, and
    based on determining the second sum value is greater than the targeted beginning location, the local insert location is set as an upper bound of the bracketed range, and
    based on determining that the second sum value equals the targeted beginning location, set the local insert location to be the targeted beginning location, and cease searching among the sorted subset of data,
  share a location of a greatest local value known to be less than the proposed value with the plurality of computing nodes within the distributed system and cease searching among the sorted subset of data when the bracketed range equals zero,
  determine, during at least one of the iterations, one of the one or more proposed values and share the one of the one or more proposed values with the plurality of computing nodes within the distributed computing system; and
cause one or more computing nodes to forward the subsets of data between computing nodes within the distributed computing system, the forwarding beginning from a computing node that has the targeted beginning location of the data range found from the search;
merge the forwarded subsets of data into a final data range responsive to the data request; and
send the final data range to a requesting device.

23. The at least one non-transitory machine-readable storage medium of claim 22, the sorting is performed using a merge sort algorithm.

24. The at least one non-transitory machine-readable storage medium of claim 22, the sorting is performed using a T-threaded M-block merge algorithm.

25. The at least one non-transitory machine readable storage medium of claim 22, further comprising instructions that, when executed by a computing device, cause the computing device to identify the computing node among the plurality of computing nodes that includes a subset of data that has the targeted beginning location of the data range that is responsive to the data request.

26. The at least one non-transitory machine-readable storage medium of claim 22, each of the plurality of computing nodes is labeled as a sender node or a merger node.

27. The at least one non-transitory machine-readable storage medium of claim 26, wherein sender nodes and merger nodes are configured to send subsets of data using a buffer ring.

28. The at least one non-transitory machine-readable storage medium of claim 22, wherein the merging is performed using a heap component utilizing references to one or more blocks of data.

29. The at least one non-transitory machine readable storage medium of claim 22, wherein a tie-breaker is used to ensure that the one of the one or more proposed values is between two values in a local list of values.

30. A computer-implemented method, comprising:
receiving a data request at a distributed computing system including a plurality of computing nodes, each computing node including a subset of data of a set of data stored by the distributed computing system;
causing each computing node to sort each subset of data into a defined order via one or more data sorting sessions;
cause each of the plurality of computing nodes to iteratively search among the sorted subset of data for a targeted beginning location of a data range that is responsive to the data request, each iteration to include:
receiving a proposed value of one or more proposed values from one of the plurality of computing nodes of the distributed computing system, the proposed value used to search for the beginning location of the data range,
utilizing a binary search to locate a local insert location for the proposed value, the local insert location local to the subset of data of a computing node, the binary search including:
determining a first sum value of locally stored values indicating a number of locally stored values that are less than the proposed value stored on the computing node,
determining a second sum value of globally stored values less than the proposed value, wherein the globally stored values are values stored on the distributed computing system and the second sum value to include a summation of a number of values stored on other computing nodes of the distributed computing system and the first sum value,
determining whether the second sum value is less than, equal to, or greater than the targeted beginning location,
based on determining the second sum value is less than the targeted beginning location, the local insert location is set as a current lower bound of a bracketed range, and
based on determining the second sum value is greater than the targeted beginning location, the local insert location is set as an upper bound of the bracketed range, and
based on determining that the second sum value equals the targeted beginning location, set the local insert location to be the targeted beginning location, and cease searching among the sorted subset of data,
sharing a location of a greatest local value known to be less than the proposed value with the plurality of computing nodes within the distributed system and cease searching among the sorted subset of data when the bracketed range equals zero,
determining, during at least one of the iterations, one of the one or more proposed values and share the one of the one or more proposed values with the plurality of computing nodes within the distributed computing system; and
cause one or more computing nodes to forward the subsets of data between computing nodes within the distributed computing system, the forwarding beginning from a computing node that has the targeted beginning location of the data range found from the search;
merging the forwarded subsets of data into a final data range responsive to the data request; and
sending the final data range to a requesting device.

31. The computer-implemented method of claim 30, the sorting is performed using a merge sort algorithm.

32. The computer-implemented method of claim 30, the sorting is performed using a T-threaded M-block merge algorithm.

33. The computer-implemented method of claim 30, further comprising identifying a computing node among the plurality of computing nodes that includes a subset of data that has the targeted beginning location of the data range that is responsive to the data request.

34. The computer-implemented method of claim 30, wherein each of the plurality of computing nodes is labeled as a sender node or a merger node.

35. The computer-implemented method of claim 34, wherein sender nodes and merger nodes are configured to send subsets of data using a buffer ring.

36. The computer-implemented method of claim 30, wherein the merging is performed using a heap component utilizing references to one or more blocks of data.

37. The computer-implemented method of claim 30, wherein a tie-breaker is used to ensure that the one of the one or more proposed values is between two values in a local list of values.

38. An apparatus, comprising:
a processor;
a memory unit communicatively coupled to the processor; and
logic, at least partially implemented by the processor, the logic to:
receive a data request at a distributed computing system including a plurality of computing nodes, each computing node including a subset of data of a set of data stored by the distributed computing system, cause each computing node to sort each subset of data into a defined order via one or more data sorting sessions, cause each of the plurality of computing nodes to iteratively search among the sorted subset of data for a targeted beginning location of a data range that is responsive to the data request, each iteration to:

receive a proposed value of one or more proposed values from one of the plurality of computing nodes of the distributed computing system, the proposed value used to search for the beginning location of the data range, utilize a binary search to locate a local insert location for the proposed value, the local insert location local to the subset of data of a computing node, the binary search to:

determine a first sum value of locally stored values indicating a number of locally stored values that are less than the proposed value stored on the computing node, determine a second sum value of globally stored values less than the proposed value, wherein the globally stored values are values stored on the distributed computing system and the second sum value to include a summation of a number of values stored on other computing nodes of the distributed computing system and the first sum value, determine whether the second sum value is less than, equal to, or greater than the targeted beginning location, based on determining the second sum value is less than the targeted beginning location, the local insert location is set as a current lower bound of a bracketed range, and based on determining the second sum value is greater than the targeted beginning location, the local insert location is set as an upper bound of the bracketed range, and based on determining that the second sum value equals the targeted beginning location, set the local insert location to be the targeted beginning location and cease searching among the sorted subset of data, share a location of a greatest local value known to be less than the proposed value with the plurality of computing nodes within the distributed system and cease searching among the sorted subset of data when the bracketed range equals zero, determine, during at least one of the iterations, one of the one or more proposed values and share the one of the one or more proposed values with the plurality of computing nodes within the distributed computing system, and cause one or more computing nodes to forward the subsets of data between computing nodes within the distributed computing system, the forwarding beginning from a computing node that has the targeted beginning location of the data range found from the search, and merge the forwarded subsets of data into a final data range responsive to the data request.

39. The apparatus of claim 38, wherein the sorting is performed using a merge sort algorithm.

40. The apparatus of claim 38, wherein the sorting is performed using a T-threaded M-block merge algorithm.

41. The apparatus of claim 38, the logic to identify the computing node among the plurality of computing nodes that includes a subset of data that has the targeted beginning location of the data range that is responsive to the data request.

42. The apparatus of claim 38, wherein each of the plurality of computing nodes is labeled as a sender node or a merger node.

43. The apparatus of claim 38, wherein sender nodes and merger nodes are configured to send subsets of data using a buffer ring.

44. The apparatus of claim 38, the logic to use a heap component utilizing references to one or more blocks of data.

45. The apparatus of claim 38, wherein a tie-breaker is used to ensure that the one of the one or more proposed values is between two values in a local list of values.

* * * * *